Sept. 25, 1956  F. W. McAFEE ET AL  2,763,900
DOOR FOR PRESSURIZED AIRCRAFT
Filed June 14, 1954  4 Sheets-Sheet 4
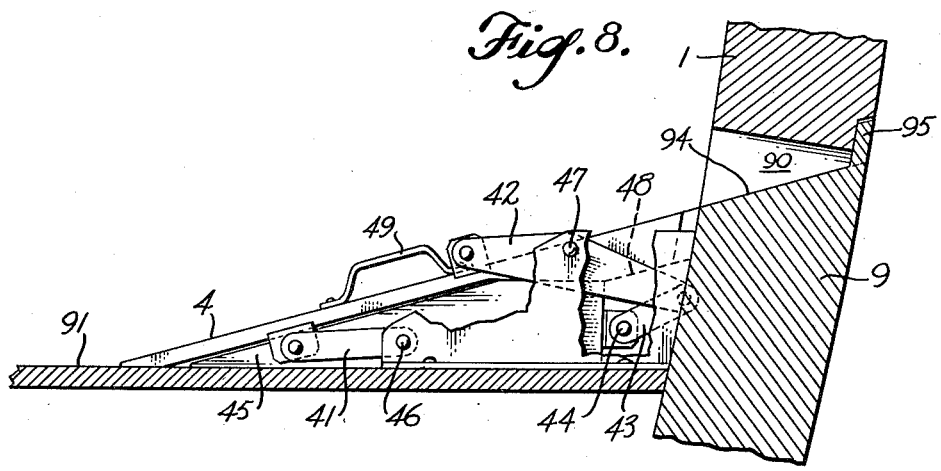
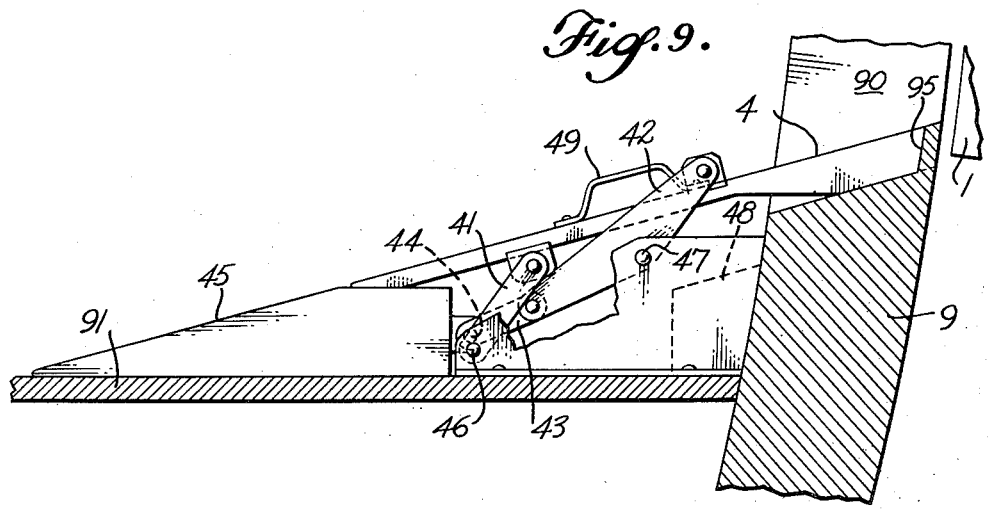
INVENTORS.
FRANK W. McAFEE
ROBERT B. SNIVELY
BY AMIL A. VANNEST
Reynolds, Beach & Christensen
ATTORNEYS United States Patent Office 2,763,900
Patented Sept. 25, 1956

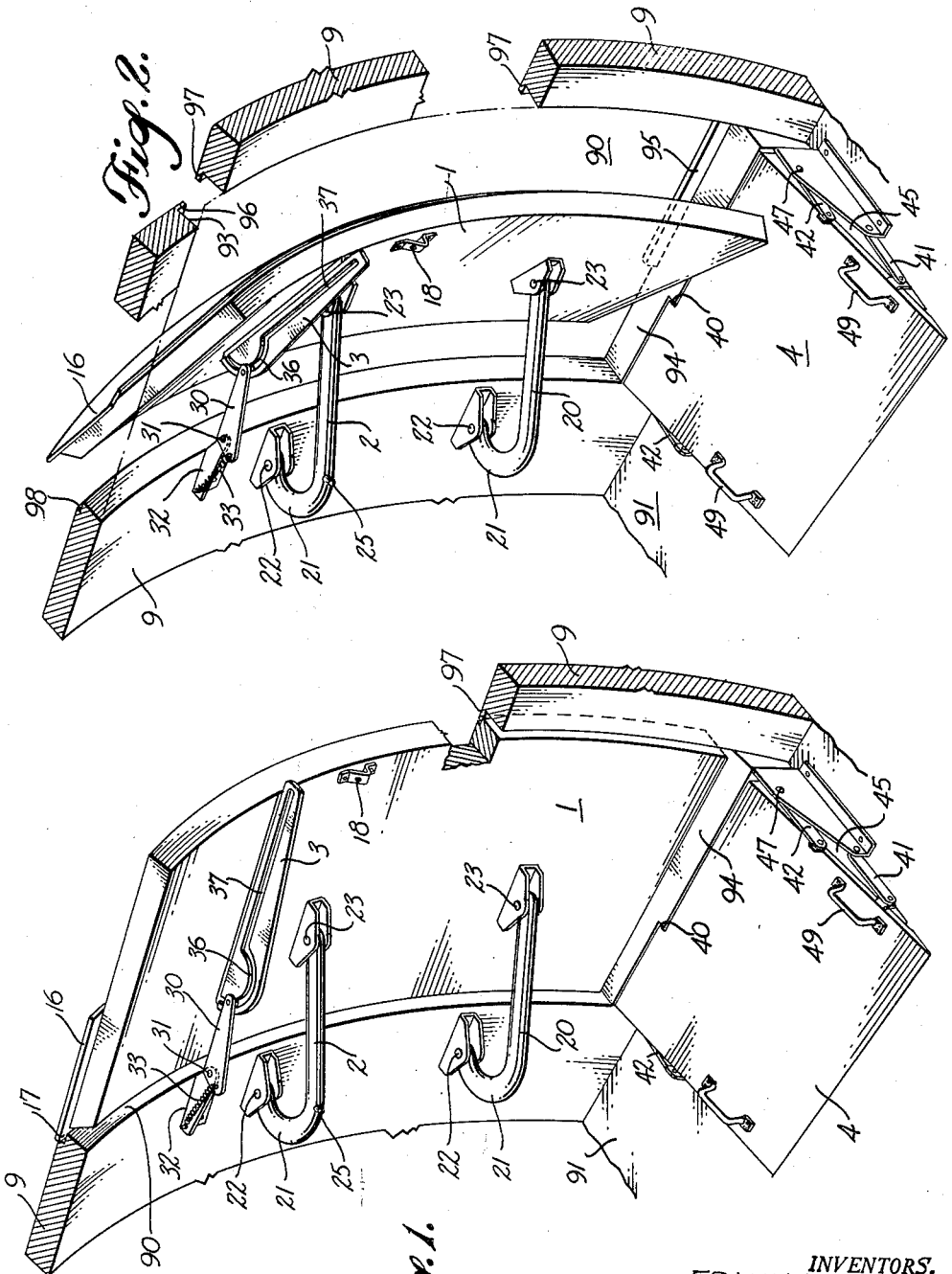

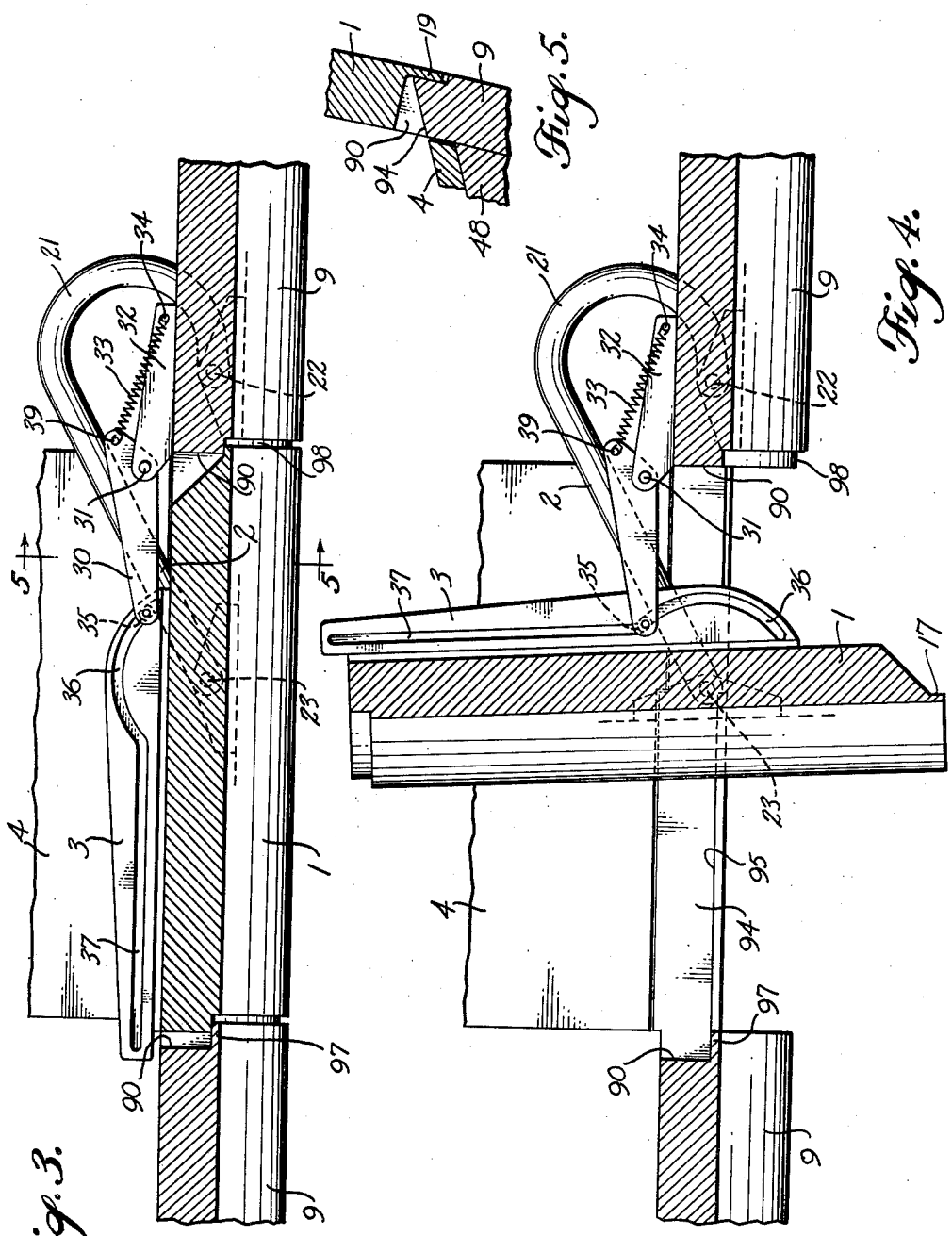

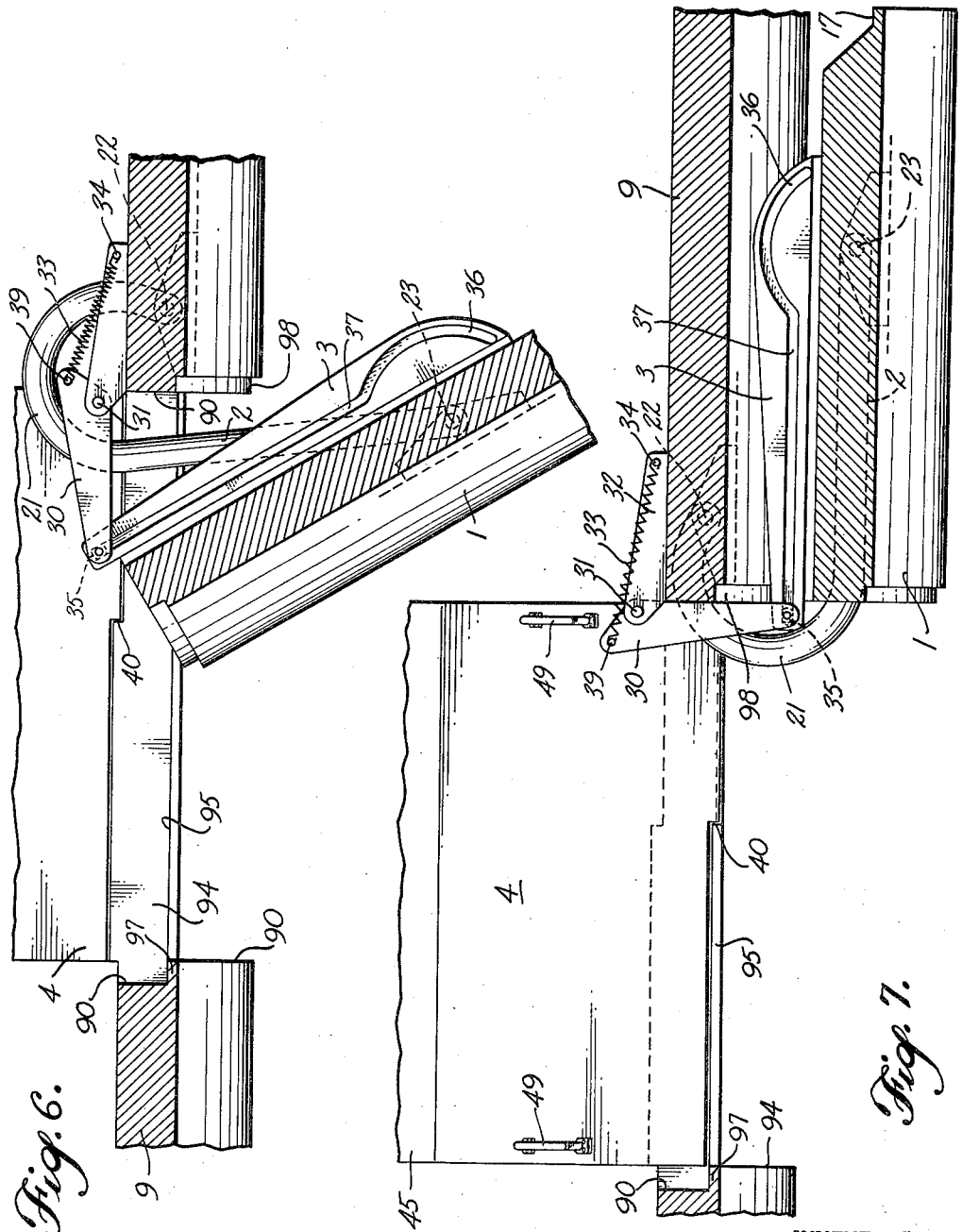

2,763,900
DOOR FOR PRESSURIZED AIRCRAFT

Frank W. McAfee, Robert B. Snively, and Amil A. Vannest, Seattle, Wash., assignors to Boeing Airplane Company, Seattle, Wash., a corporation of Delaware Application June 14, 1954, Serial No. 436,276

13 Claims. (Cl. 20—16)

The present invention concerns a closure, including a door and the structure which defines the frame of the doorway and supports the door, especially such a closure as is suited for employment on pressurized cabin aircraft for entrance and exit of passengers.

Aircraft cabin doors for entrance and exit invariably open outwardly, for the interior space is too restricted for inward opening, and the curvature of such doors and of the cabin wall framing the doorway also prohibits its inward opening. They are held closed by latches, locks, and similar mechanical securing means interconnecting the door and the door frame. There have been occasions when such a door, or its securing means, has yielded to the super-ambient internal pressure at high altitudes, and has blown out. In blowing out, a strong and sudden outdraft is created, and it is not unknown to have such an outdraft blow a person standing near the door out through the doorway, in which case, of course, his life is lost, for persons riding on such pressurized-cabin aircraft are not ordinarily equipped with a parachute.

It is a particular object of the present invention to provide a door for use in such an environment, which does not depend upon mechanical latches, locks, or other securing means to hold it closed in opposition to the internal pressure, but which is held to a seat by the higher internal pressure, and can not be opened until the pressure within the cabin and the ambient pressure are substantially equalized.

It is also an object of this invention to provide a closure of the character indicated, in which the door may be curved in normal conformance with the general curvature of the airplane cabin wall at the doorway, and which will not only function in the manner already indicated, but which will enable the door, when fully opened, to lie closely against the exterior surface of the airplane cabin wall, adjacent but to one side of the doorway, with its curvature and the curvature of the cabinet wall structure generally coinciding.

It is a still further object to provide means which will guide the door properly during its opening and closing, and which, in particular, may have associated spring means that will assist in overcoming friction in the cam track and its follower, used to guide movement of the door between open and closed positions.

The door seats along its lower edge, and elsewhere, against a raised flange directed inwardly about a principal portion of the doorway, and in order that a passenger going through the doorway may not stub his toe on this flange, means are provided in the form of a shiftable ramp device, operable when the door has been opened, to bring the walkway at least even with the top of the flange, and so to eliminate the danger of stumbling. Additionally, this ramp device is so made that it will retract into small compass when the door is closed, so that it will occupy only a small amount of space during flight.

The mechanical details for carrying out the purposes indicated will be better understood as this specification progresses, and the principles and structures wherein the invention resides will be defined in the claims which terminate this specification.

In the accompanying drawings, the invention is shown embodied in a presently preferred form, and as it is to be applied to a production airplane. Various details, however, have been omitted or shown in simplified form for greater clarity of illustration and understanding.

Figure 1 is an interior isometric view of the closure, with parts in the closed, or flight, position, and Figure 2 is a view similar to Figure 1, but showing parts in the process of opening or closing.

Figure 3 is a longitudinal horizontal sectional view through the closure, taken generally along the plane of the door guiding means, with parts in the closed position of Figure 1, and Figure 4 is a similar sectional view, but showing parts in process of moving toward the open position. Figure 5 is a detail section through the lower edge of the door and doorway, along the line 5—5 of Figure 3. Figure 6 is a sectional view similar to Figures 3 and 4, showing the opening further advanced, and Figure 7 is a similar sectional view, showing parts in the fully open position, and with the shiftable ramp device shifted to its operative position.

Figure 8 is a general side elevational view, with the aircraft structure and door shown in transverse vertical section, illustrating all parts, and particularly the ramp device, in the door-closed position, and Figure 9 is a similar view, showing the ramp device shifted to its operative position, corresponding to Figure 7, and with the door fully open.

An aircraft cabin wall structure is illustrated generally at 9; structural details of the same have been omitted. These may be any that are suitable or usual. A doorway 90 is provided therein which is closed by a door 1 of a size and shape to close the doorway, as will be more fully explained hereinafter. In the illustrated embodiment, it is assumed that the cabin wall structure 9 is curved in transverse cross section, and that the floor 91 is at a level more or less near the horizontal diametral plane, so that the cabin wall at the level of the lintel 93 of the doorway (see Figure 2) is farther inboard than is the sill 94. Such details are not essential insofar as they concern the present invention, but are normal and to some degree complicate the arrangements which are part of this invention.

It will be observed that the sill at 95 and the lintel at 96 are flanged from one vertical side edge across towards the opposite vertical side edge, and these flanges are directed inwardly toward the center of the doorway, at or in the vicinity of the exterior wall surface of the cabin wall structure 9. In addition, and preferably, this same vertical side edge of the doorway is similarly flanged inwardly at 97. The flange 97 may and preferably does extend the full height of the doorway, but the flanges 95 on the sill and 96 on the lintel preferably extend from the flange 97, or from the side of the doorway where the flange 97 is located, towards but not to the opposite vertical edge of the doorway. Each of the flanges 95 and 96 stops short of the opposite vertical side edge of the doorway by sufficient to enable the door to pass edgewise between the ends of these flanges and this side of the doorway. If the door were planar, it might be possible to slip it through edgewise with very little spacing between the ends of these flanges and the opposite edge of the doorway, but since the door is curved in conformance with the curvature of the cabin wall structure at the location of the doorway, and its upper edge lies somewhat inwardly of its lower edge, because of its location principally above the horizontal diametral plane, it will be necessary to leave somewhat greater unflanged space. However, a principal portion of the doorway will be so flanged at 95 and 96, and it is contemplated in the particular design illustrated that about sixty per cent of the width of the doorway will be thus flanged.

Conversely, the door is outwardly flanged along its upper horizontal edge at or in the vicinity of its outer skin, as indicated at 16, and a similar flange 19 extends outwardly, that is to say downwardly, from its lower horizontal edge. These flanges are directed across the door from that vertical edge which is opposite the flanged edge 97 of the doorway. Preferably also the door's vertical edge opposite the flange 97 is outwardly flanged, as at 17 (see Figure 1). These flanges 16, 17, and 19 seat upon recesses provided at 98 at this side of the doorway. The flanges 95, 96 and 97 on the doorway and the flanges 16, 17 and 19 on the door together define substantially the complete doorway and provide flanges which seat upon the complemental member, the door or the doorway, as the case may be. That is to say, the one edge of the door seats upon the flanges 95, 96 and 97, and the opposite edge of the door has flanges 16, 17, and 19 which seat upon the exterior surface of the doorway, and together these make up a substantially complete perimetral closure. Sealing gaskets or the like may be provided for completing the seal at these points, but have been omitted for clearer illustration.

The door is supported by link means, and preferably two or more individual links are provided for the purpose, even though theoretically a single link would serve. An upper link 2 and a lower link 20 are of like hook formation at one end, the hooks being indicated at 21, and are pivotally mounted each at the hooked end, within and alongside the door opening 90 at the unflanged edge of the door opening. They should be mounted to swing about a common axis defined at 22. At their opposite ends they should be pivotally connected, also upon a common axis 23 parallel to the axis 22, to the door intermediate its vertical edges.

It will be clear that when the door is in its closed position as illustrated in Figures 1 and 3, internal cabin pressure superior to the ambient pressure will urge the door outwardly against the flanges 95, 96 and 97, and since these occupy the principal portion of the perimeter of the door, the fact that they do not occupy the entire perimeter is immaterial, for the door will be urged primarily against its seats on these flanges of the doorway. Indeed, the arrangement might be such that the balance of pressure will cause the opposite or left edge of the door to be tilted slightly inwardly to urge the door's flanges 16, 17 and 19 also against their seats. So long as this condition of a pressure difference obtains, it will not be possible to open the door, and it cannot be blown out, assuming the flanges 95, 96, and 97 to be strongly enough built. It will be provided, of course, with suitable locks or latches which have not been shown herein, but dependence is placed on its seating at the flanges 95, 96 and 97 to hold the door shut, rather than upon any such latches, etc.

When the airplane has landed, however, and it is desired to open the door, the pressure between the interior of the cabin and the ambient pressure having been first equalized, it is readily possible to pull the door somewhat inwardly and to swing it about its pivots at 23. There may be also some inward swinging about the pivots at 22. This pulls the several flanges away from their seats and moves the door from its Figure 3 position eventually into the edgewise position of Figure 4, its flanges 16, 17, and 19 being always outside the doorway, wherein it may pass edgewise beyond the ends of the flanges 95 and 96, and so may swing primarily about the pivots at 22 through the position of Figure 4 to such a position as that shown in Figure 6, and finally, tilting back against the straight portion of the links 2 and 20, the door will reach the position of Figure 7, where it will fold back closely against and in general conformance with the curvature of the exterior of the cabin wall structure 9. A friction latch composed of the two parts 25 on the link 2 and 18 on the interior face of the door may interengage to hold parts in the open position. When the door is to be closed, the operation is reversed, and the door will complete its movement in the closed position of Figures 1 and 3.

It is desirable to provide door guiding means which also will assist in closing the door. A link 30 is pivotally mounted at 31 upon a bracket 32 along the hinging side of the door, the hinge axis 31 being located somewhat inwardly of the vertical edge of the door at the interior side thereof. This link 30 may be formed as a lever of the first class and an extension spring 33 may extend from a fixed anchorage at 34 upon the interior of the cabin wall structure to a connection at 39 at one end of the link or lever 30. The opposite end of the link 30 is formed as a cam follower 35 received within a cam slot in a cam bracket 3 directed transversely of the inside of the door. The cam slot is formed with a curved portion 36 at one end and a straight portion 37 at its opposite end, and extends substantially across the entire width of the door and preferably a slight distance beyond the unflanged edge of the door. The cam track and cam follower by their interengagement serve to induce first rotational movement of the door about the pivot at 23 from the position of Figure 3 to the position of Figure 4, and thereupon as the door swings outwardly through the doorway, the cam follower moves along the straight portion 37 of the cam track until parts reach the position of Figure 6. Thereafter, as the door swings to its fully open position of Figure 7, the lever 30 is caused to pivot about its axis at 31 and the spring 33 is extended, while the outward swinging of the link 30 moves the door sufficiently outwardly that it may in its open position lie alongside of but just outwardly of the cabin wall structure. During closing of the door the tensioned spring 33 will assist in overcoming friction of 35 in 37.

It will be observed, particularly in Figure 2, that the upstanding flange 95 of the sill would constitute a hazard in that a person in passing out or in through the doorway might stub his toe on the same. To eliminate this hazard and to give ready access from the floor 91 to the doorway, the sill 94 of which is raised somewhat in any event above the floor level 91, there is provided a ramp device which includes a ramp section 4. This ramp section 4 may be notched as indicated at 40, in general conformance with the flange 95, and is mounted for movement outwardly and upwardly to overlie the sill 94 as in Figure 9, or to be retracted below the sill in order to permit closing of the door. Any suitable means to such ends are usable, and yet the form shown is particularly suited to the door-seating arrangement described. As shown herein, the ramp section 4 is supported on generally parallel links 41 and 42, pivoted fixedly at 46 and 47, respectively. The link 42 is extended, as a lever, the end whereof is connected by a link 43 to a pivot at 44, whereby it is connected to a sliding ramp section 45 which rests upon and slides along the floor 91, and which is inclined along its upper surface. In addition, there is a fixed ramp-supporting surface at 48.

The geometry of the ramp sections, links, inclines, and fixed supports is such that when the ramp is engaged by handles 49 and is moved outwardly from its stowed position of Figure 8 and eventually to the operative position of Figure 9, the ramp section 4 will move somewhat upwardly and outwardly, the slidable ramp section 45 will slide inwardly, and will support the inner edge of the ramp as it raises the same. The outer edge of the ramp will ride over and rest upon the inclined sill 94, and it will be high enough to come at least to the height of the flange 95, if not to overlie the latter. In any event, the two ramp sections together will provide a smooth, substantially uninterrupted rampway on which a person is not likely to stumble. For stowage, the ramp section 4 is moved inwardly and downwardly, reversely to the operation described, and this slides the ramp section 45 outwardly, beneath the stowed position of ramp section 4, where it takes up less of the cabin floor area.

We claim as our invention:

1. A closure, especially suited for a pressurized aircraft cabin, comprising, in combination with a door frame, flanges inwardly directed at the exterior side of said frame and extending from one end of the sill and lintel towards, but stopping short of, the opposite side to leave there an unflanged section, a door of a size to pass through the doorway in its unflanged section but to seat on the interior face of the flanges, and to be held thereto by any internal cabin pressure, door-supporting link means, first pivot means having an upright axis and supporting one end of said link means from the interior face and at the unflanged side of the door frame, and second upright pivot means supporting said door, at a point intermediate its side edges, from the opposite end of said link means, whereby upon swinging the door inwardly about the first pivot means, and rotating it about the second pivot means, it will pass edgewise through the unflanged section of the door frame.

2. A closure, especially suited for the entrance to a pressurized aircraft cabin, comprising, in combination with the cabin wall structure and a door frame therein, flanges directed inwardly of the sill, one upright side edge, and the lintel of said frame, at the exterior side of the frame, for the major portion of the length of the sill and lintel, but stopping short of the opposite upright side to leave the sill and lintel unflanged at this side, a door of a size to pass through the unflanged side of the door frame but to seat on the interior face of the flanges and to be held thereto by any internal cabin pressure, door-supporting link means of hook formation at one end, first pivot means carried by the unflanged side and upon the interior face of the door frame, supporting the hooked end of said link means to swing about an upright axis, and second upright pivot means supporting said door, at a point intermediate its side edges, from the opposite end of said link means, whereby upon swinging the door inwardly about the first pivot means, and rotating it about the second pivot means, it will pass edgewise through the unflanged side of the frame, and can be folded back against the exterior of the cabin wall structure, with its interior face against the cabin wall structure's exterior surface.

3. A closure as defined in claim 2, wherein the cabin structure and the door are similarly curved in the vertical direction, and the door, when in its open, folded-back position, lies closely against the curvature of the cabin structure.

4. A closure as defined in claim 3, wherein the link means comprise two like hooked links, one supporting the upper part and the other the lower part, of the curved door, and both oriented to dispose their respective pivot means coaxial, said pivot means being located wholly within the cabin wall structure and spaced longitudinally of the cabin from the unflanged side of the doorway.

5. A closure as defined in claim 2, and guide means for swinging of the door comprising a cam track mounted upon the inner face of the door and directed transversely thereof, a door-guiding link pivotally mounted upon the interior of the door frame at the door-supporting edge thereof, at a point inwardly of this edge of the frame, a cam follower at the free end of said link, operatively engaged with said cam track, said link being of a length to extend exteriorly of the door frame and to remain engaged with the cam track when the opened door is folded back against the exterior of the cabin wall structure.

6. A closure as defined in claim 5, wherein the cam track is curved, at its end, adjacent the unflanged side of the frame, to induce rotation of the door about the second pivot means in advance of its outward movement edgewise about the first pivot means.

7. A closure as defined in claim 5, including spring means operatively engaged with the door-guiding link, and arranged to be stressed by outward movement of the door towards open position.

8. A closure as defined in claim 5, wherein the door-closing link is formed as a first degree lever, and an extension spring connecting its end opposite the cam follower, with a fixed anchorage on the door frame, to be tensioned by opening of the door and the accompanying pivotal movement of the door-closing link.

9. A closure as in claim 1, and an inclined ramp device, means supporting said ramp device, adjacent the door frame's sill, for movement towards and from the sill, and means guiding the ramp device, at its end nearer the sill, for upward movement as it approaches the sill, to eventually overlie the sill and to shroud the sill's flange, and for downward movement as it recedes from the sill, to lie eventually below the lower edge of the door.

10. A door closure as in claim 9, wherein the ramp device includes an upper and a lower section, means supporting the upper section for upward and outward movement from its inoperative position to its operative, flange-shrouding position, the lower section being guided for inward and outward sliding movement, and means interconnecting the two ramp sections for movement of the lower section inwardly from an inoperative position beneath the upper section, by movement of the upper section to its shrouding position, to a position in inward extension of such upper section when in such shrouding position.

11. A closure as in claim 1, including flanges at the exterior of the door, along its upper and lower edges at the unflanged side only of the door frame, arranged to seat upon the door frame.

12. In combination with a structure forming a door frame defining a doorway and having a raised sill, and a door movable to close such doorway, a two-part ramp device including an upper and a lower ramp section, means supporting the upper section and guiding the same for movement from an inwardly retracted position, wherein it lies below the level of sill structure, in a generally upward and outward direction to an operative position wherein its outer edge overlies the sill, means supporting and guiding the lower section for generally horizontal movement from a retracted position, wherein it lies beneath the upper section, inwardly to an operative position wherein its outer edge underlies and supports the inner edge of the upper section, and means interconnecting the two ramp sections for conjoint movement into operative position and conversely into retracted position.

13. The combination of claim 12, wherein the supporting means for the upper ramp section comprises generally parallel links, and the interconnecting means between the two sections includes a lever extension of one such link and a link between its end and the lower section.

References Cited in the file of this patent

UNITED STATES PATENTS

| | | |
|---|---|---|
| 1,914,559 | Dath | June 20, 1933 |
| 2,173,644 | Blackmore | Sept. 19, 1939 |
| 2,323,279 | Van Zelm | June 29, 1943 |
| 2,434,464 | Lemonier et al. | Jan. 13, 1948 |
| 2,564,988 | Muller | Aug. 21, 1951 |